Nov. 22, 1960 C. J. DE CARO 2,960,902
EXPLOSIVELY ACTUATED FASTENER
Filed March 4, 1957

INVENTOR:
CHARLES J. DE CARO
BY
John D. Wilkins
ATTORNEY

United States Patent Office 2,960,902
Patented Nov. 22, 1960

2,960,902

EXPLOSIVELY ACTUATED FASTENER

Charles J. De Caro, Cleveland, Ohio, assignor, by mesne assignments, to Olin Mathieson Chemical Corporation, a corporation of Virginia Filed Mar. 4, 1957, Ser. No. 643,588

18 Claims. (Cl. 85—36)

This invention relates to the securing of adjacent objects and more particularly to a fastening device such as a nut and bolt assembly, a rivet or a connector for securing objects such as sheets, plates, cables, rods and the like and also to a method of fastening.

An object of this invention is to provide an explosive fastener enabling rapid fastening with increased strength, safety and convenience as well as economy. Another object is to provide a nut and bolt type of fastener of a construction which avoids tedious threading and screwing down operations. Still another object is to provide a new and improved type of explosive composite rivet or fastener. Still other objects and advantages will become apparent from the description of various specific embodiments of the invention when taken together with the accompanying drawing in which.

Figure 1:
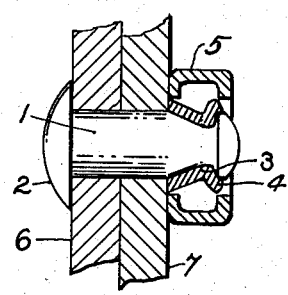
Figure 1 is a cross sectional view of a composite fastener embodying this invention with the parts shown secured together after the explosive has been fired.

In accordance with this invention there is provided a fastening assembly including a fluid pressure deformable outer or nut member adapted for being firmly attached to a rod, pin, stem or the like portion of another member. More specifically and preferably there is provided a female member charged with explosive in such a manner as to direct the blast radially inwardly to accomplish maximum deformation of at least a portion of the female member to provide the strongest connection with the least amount of explosive and with a minimum of blast and noise. This member is at least initially of hollow construction and may consist of one or more parts and when subjected to fluid pressure expansion as by detonation of the explosive undergoes a contraction of the inner wall of the member about the shank of a bolt or the stem of a rivet.

In contrast to prior art procedures and devices wherein explosive cords have been wound about the exterior of two members to be joined at a hole, or wherein an explosive charge is emplaced in the bore of a hollow inner member in the vicinity of a hole, it has been found according to this invention to be of advantage to accurately arrange an expanding explosive charge in a cavity of the outer member about the other with concentric relationship with some accuracy in the vicinity of the hole in such a way as to provide not only a particular confinement for the self-contained charge, but also a predisposition for the resulting expansion to occur in a desired direction and with desired uniformity at the hole to accomplish joining explosively. The self-contained charge is initially sealed in such a way as to permit venting only at the terminal portion of the expansion. The self-contained confined charge is predisposed for accomplishing deformation adjacent one of the surfaces of the outer member either by means of a differential in the properties of the material adjacent other surfaces or by remotely or closely positioning the charge toward that surface at which preferential deformation is to occur. In this way the need for large charges is avoided because all of the charge is usefully employed and a reduction in noise and blast is obtained. A lopsided joint is avoided. Furthermore, there is avoided the difficulty of trying to accurately position an interior charge at some point down a tubular member to do the work; and there is no need after expansion to remove lead wires or the like from any of the memebrs and to flush out any residue in the form of fragments and products of combustion.

This invention involves the method of making connections such as coupling, riveting, bolting or the like between objects comprising making a hole in one of the objects, forming in said object in circumferentially extending radially spaced relationship around said hole a cavity substantially closed initially except for no more than a restricted but ultimately opening vent communicating between said cavity and the exterior surface of said object, inserting a portion of a second one of said objects into said hole with a close fit therein, and then introducing a fluid into said cavity under sufficient pressure to stress the material of said first object beyond the elastic limit thereby permanently expanding said first object inwardly into firm grasping contact with said second object, and this more safely and quietly.

Strong explosives thus can be used; and, therefore, this arrangement has the advantage of making a joint of better tightness not only from better efficiency but also from the concentricity and annular continuity, unlike any external charge wrapped spirally and with anything but equality of spacing.

In any event there is provided a double-walled arrangement orificed axially to form a surrounding object telescopically contained in the first. The inner wall may be a separate sleeve preferably of sufficient length for some embodiments to provide enough material to be compressed about the contained or male member without excessive axial contraction. The inner member as a sleeve nut is of sufficient radial thickness at least at one end to provide a good abutment with other objects to be connected by bolting or riveting. In one preferred form the inner wall is thicker at one end and/or may extend radially outwardly a greater extent than at the other end in order to provide a good abutment with the work pieces to be secured together. In still another preferred form the inner wall is bowed outwardly in such a way that upon development of the deforming pressure the wall flexes inwardly toward the piece to be secured therewith to provide not only the necessary deformation but also adequate axial length in those instances where axial contraction is likely to occur on account of take-up of the material of the inner wall into one or more knurled depressions or circumferential grooves on the male member. The threaded or grooved end of a bolt is contemplated for connection but it is to be understood that a suitable smooth or roughened portion may also be suitable when the expanding pressure is applied at a suitable level and with sufficient impact.

Whether the double-walled structure of the nut or female member consists of a single piece or of two parts, the inner part or wall portion is of deformable material such as aluminum while the outer surrounding and confining portion or member is of a relatively hard, tough relatively rigid material such as steel. It is to be understood that various suitable combinations of materials may be employed and the fastener may be made of one or more of such materials as steel, Monel and the softer materials such as brass, copper and preferably light metals such as aluminum and its alloys of any suitable softness or relative hardness. The metal parts of the explosive nut member may take various shapes as illustrated in the drawings and may be made from various combinations of smooth sleeves, recessed sleeves, hollow metal tubing packed with explosive, parts turned on a screw machine and sheet metal sleeves or ferrules suitably crimped to form a double-walled structure and enclosed cavity.

The male member may be of any suitable shape such as a rod, bolt or rivet having any suitable circumferential surface adapted for engagement with a nut member. Such surface is preferably roughened or grooved with one or more grooves of the type shown in Figures 1 and 9 of the drawing, for example.

The outer wall portion of the nut member provides confinement not so much in the sense of enclosing the explosive to increase its shattering power but rather to provide radial an axial confinement so as to direct the energy of the blast inwardly where it will do the most good. This outer wall portion or sleeve may be self-detachable or be capable of remaining as a part of the inner wall or collar as part of the fastening. It is contemplated that the outer wall member might be a rather thin piece merely for the purpose of retaining and sealing the explosive charge on the nut member and that radial confinement may be provided by a recessed muzzle portion of a tool adapted to not only hold the nut part of the fastener but to also ignite the explosive charge or otherwise apply fluid expansion pressure to the interior of the deformable nut member of this invention.

The female or nut member of this invention is provided with at least one cavity adapted to take an expanding pressure and cause desired deformation of this member. An annular cavity is contemplated and is to be initially sealed but finally and desirably vented at the terminal portion of the blast so as to obtain a rather sudden as compared to a gradual application of pressure without accompaniment of undesired fragmentation. In any event, the cavity is disposed in relationship to an outer wall portion in such a way as to direct the working effect of the blast of the explosive inwardly against the inner deformable member.

The cavity contains a relatively small charge of explosive material of desired sensitivity to heating, electric sparking or percussion preferable. Any suitable explosive or combination thereof may be employed to obtain the desired heat, electro-static or percussion sensitivity together with the necessary energy level and impact. The charge contemplated is any one or more of hexamethylene-triperoxide-diamine with or without inert filler substances, lead azide with or without tetracene, low velocity explosives such as black powder or smokeless powder of rather high nitro-glycerine content, high explosives such as tetryl, or PETN with or without TNT in various blends, lead styphnate, and preferably blends such as a 30–70 mixture of tetracene and PETN or a 30–70 mixture of tetracene and RDX. The composition of the explosive mix is varied to be compatible with and suit the materials and size of the fastener and the needs of the work.

The explosive charge is tailored for each fastener taking into consideration the amount of confinement provided and the amount of venting or relief opening available. Upon firing the charge expands the cavity so as to contract the fastener collar without blowing the parts of the fastener to pieces. The construction of the fastener is such as to provide the necessary relief opening while allowing economical manufacture of the component parts of the fastener to less exacting standards of dimensions and weights.

Figure 2:
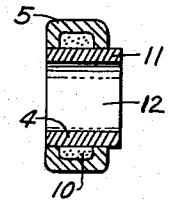
Figure 2 is a cross sectional view of the nut member of Figure 1 prior to explosive firing.

Figure 1 shows a typical embodiment including a rivet 1 having at one end a head 2 and at the other a circumferential groove 3 into which the deformable collar 4 is explosively compressed so as to secure the two plates 6 and 7. There is also shown an outer sleeve or confining member 5 which in this embodiment may well be detachable from the assembly. The nut member prior to expansion is shown in Figure 2 and consists of the collar 4 having a smooth bore 12 of uniform size and one end 11 extending beyond the sleeve 5 internally cavitated for containing an annular charge 10 of suitable explosive. Collar 4 is of a readily deformable material compatible with the material of the rivet 1 and of a length such that extension 11 provides sufficient borrow material for take-up needed as a result of deformation into the groove. The confining member 5 is of a tough hard relatively rigid material such as SAE 4130 steel hardened and drawn to a Rockwell C hardness of from 28–33.

Figure 3:
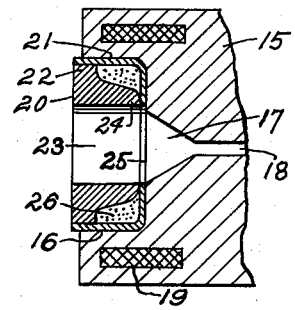
Figure 3 is a cross sectional view of another embodiment especially adapted for application with the aid of an explosive igniting and fastening nut confining tool.

In the embodiment of Figure 3 the deformable collar 20 extends radially outwardly at one end 22 to a greater extent than the other end 24 leaving a cavity 26 at the latter end which is charged with explosive enclosed when collar 20 is assembled with a relatively thin, flanged, sealing sleeve or cap 21. This embodiment is also adapted to take the connecting end of a fastener into the bore 23 of collar 20 and provides an enlarged abutment 22 to be shouldered against the objects to be fastened. Radial confinement in this embodiment is provided by the tool 15 having a recess 16 for reception of the nut member and having a heating coil 19 for ignition of the charge 26. The tool is adapted to press against the flange 25 of sleeve 21 to hold the nut against the work surface while the charge is being fired and has a clearance 17 and vent 18 to channel any products of combustion escaping.

Figure 4:
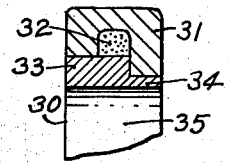
Figure 4 is a fragmentary view in cross section showing a third embodiment of a fastener part according to the invention.

In the embodiment of Figure 4 collar 30, as in the previous embodiments, is heavier at one end 33 than at the other end 34 and is assembled with an annularly recessed sleeve 31 containing a charge 32 which upon ignition deforms the collar 30 into the collar bore 35.

Figure 5:
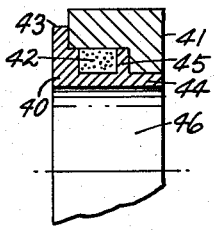
Figure 5 is a fragmentary view in cross section of a fourth embodiment having improved abutment and sealing.

In Figure 5 collar 40 has exterior flanges 43 and 45 forming an exterior circumferential cavity containing the charge 42. The flanged confining sleeve 41 is of relatively heavy construction and closes the annular cavity 42 and directs the blast inwardly so as to deform collar 40 toward the collar bore 46 drawing additional metal, if ncessary, from the end portion 44.

Figure 6:
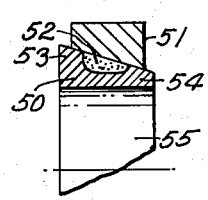
Figure 6 shows a fragmentary view of a fifth embodiment having good sealing and relative simplicity.

In Figure 6 collar 50 and sleeve 51 are secured together in aligned sealing relationship by means of a taper fit leaving the enlarged end 53 of collar 50 suitable as an abutment as compared to the smaller end 54. Annular charge 52 is contained in the collar and is directed by sleeve 51 to cause deformation toward the collar bore 55 to make the desired connection. Sleeve 51 is axially shorter than collar 50, but is long enough to close the cavity 52 without being flush with the ends of the collar.

Figure 7:
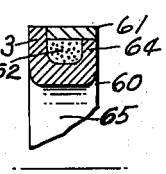
Figure 7 shows a sixth embodiment adapted to fabrication from sheet metal.

In Figure 7 collar member 60 is formed from a sleeve, the ends of which are turned over to provide one long flange 63 and a short one 64 leaving between them an exterior cavity charged with explosive 62 closed and confined by the sleeve 61 all extending around the collar bore 65.

Figure 8:
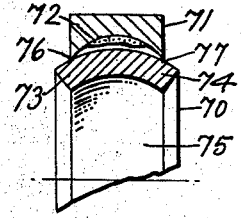
Figure 8 shows a seventh embodiment.

In the embodiment of Figure 8 there is provided a heavy collar 70 which is longer than the recessed sleeve 71 and is bowed outwardly with respect to the collar bore 75 so as to extend into the annular explosive containing recess 72 of the sleeve to project at 73 and 74 beyond the ends of sleeve 71 and form a circumferential end seal for the cavity at 76 and 77.

Figure 9:
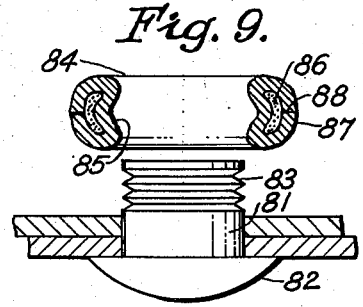
Figure 9 shows a nut member according to a further embodiment of one-piece construction.

In Figure 9 there is shown a rivet 81 having a head 82 and a plurality of grooves 83 at the other end adapted for explosive connection with the one-piece sleeve nut 84 consisting of a toroidal-shaped body the inner wall 85 of which is bowed into the cavity 86 to provide the desired excess of metal for reception in the grooves 83. The outer wall 87 is circumferentially split at 88 to provide the desired vent.

Figure 10:
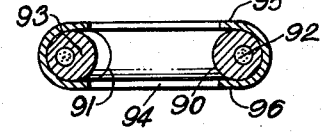
Figure 10 shows another embodiment.

According to Figure 10, the nut member consists of an O-ring 90 radially split at 91 and containing an eccentric explosive charged cavity 92. The ring consists of deformable material thickest at the inner wall 93 and having a cavity which occupies about 0.2 of the overall thickness of the ring, for example. A higher degree of radial confinement is provided by the relatively rigid encasing sleeve 94 having end flanges 95 and 96 which make the assembly a permanent one, even though the ring is compressed inwardly upon explosion of the charge. For certain purposes and with certain expanding charges, and particularly where a tool of the type shown in Figure 3 is depended upon for surrounding confinement, sleeve 94 may be eliminated and explosive charge 92 may be centered in the ring.

Figure 11:
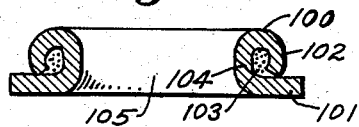
Figure 11 shows a still further embodiment.

The explosive nut of Figure 11 consists of a ring 100 having a work abutting flange 101 at one end and a crimp 102 extending from the other end so as to form the outer confining wall for the explosive containing cavity 103. Upon firing the charge contracts the inner wall 104 toward the bore 105 into firm grasping relationship and draws any extra material needed from the outer wall 102.

It will be noted that the embodiments of Figures 8, 9, 10 and 11 are especially adapted for modern manufacture methods so that they can be readily and economically made by mass production methods which will occur to those skilled in the metal shaping art. For example, in Figure 8, collar 70 is at first preferably a straight tube so that sleeve 71 may be slipped over it after which collar 70 is spun outwardly so as to fix it in the sleeve and seal the cavity 72.

What is claimed is:

1. For fastening assembly to a male member having an exterior circumferentially extending surface, a female member comprising a connector ring adapted to be telescoped into axially fixed relationship with said other member, said ring having a circumferentially extending substantially initially closed continuous cavity with means to subject said cavity to explosive pressure circumstantially uniform and sufficient to permanently expand one part of said ring inwardly, said expandable part having an interiorly facing circumferentially extending surface concentric with said cavity and adapted to be plastically shaped into final form-fitting axially retained relationship with said male member upon expansion of said part, said ring having at least initially associated with said cavity another part providing both radially and axially effective explosive pressure inward confinement outer wall means resistant to outward movement and fragmentation by said expansion pressure and substantially more resistant to deformation by said pressure than said expandable part, said outer wall means consisting of (1) (2) circumferentially extending end flanges at least one of which is fixed to at least one of said wall means and expandable part, while at least the other is held in separable circumferential abutment with one of said wall means and expandable part, in axially spaced relationship and (3) an intervening circumferentially extending sleeve portion concentric with both said cavity and expandable part, thereby adapting said female member for circumferential uniform assembly and said cavity to circumferentially substantially uniform final venting at said abutment by separation.

2. The arrangement of claim 1 wherein the cavitated female member is loaded with an explosive charge adapted for percussive ignition of the explosive charge.

3. The arrangement of claim 1 wherein the cavitated female member is loaded with an explosive charge adapted for thermal ignition of the explosive charge.

4. The arrangement of claim 1 wherein the cavitated female member is loaded with an explosive charge adapted for electrostatic ignition of the explosive charge.

5. A device for securing objects explosively comprising a stem member having at least one circumferentially extending exterior groove and a collar member of de-deformable material having a bore of uniform diameter adapted to be put into coaxial relationship about the grooved portion of said stem member, a circumferentially extending charge of explosive material, and outer relatively rigid means fitting with said collar member about said charge for initially substantially confining said charge to direct the explosion thereof radially inwardly and axially with respect to said collar member for putting said members in securing relationship, said collar member and confining means comprising means for causing relative detachment thereof upon explosion of said explosive material charge, said rigid confining means being separable upon explosion from said collar member.

6. An explosive securing device adapted to join at least two objects with surfaces in contact by being disposed in aligned holes extending through said objects, said device comprising a headed bolt the shank of which is of sufficient length to pass through and leave an end portion of said shank projected beyond said objects, said projecting end having at least one circumferential groove, and an unthreaded nut member consisting of a collar of deformable material adapted to encircle said grooved portion of the bolt and a radially inwardly and axially confining sleeve of greater resistance to deformation than said collar press fitted about said collar and having end flanges and a circumferentially extending interior recess therein between said flanges loaded with a charge of detonating explosive for blasting said collar radially inward and deforming it into said groove, one of said collar and sleeve being movable out of contact with the other at at least one press fitted portion by explosion of said charge.

7. A device for securing objects by explosion comprising an annular double walled member having an inner wall radially spaced by axially spaced end walls from an outer wall characterized by toughness and rigidity relative to said inner wall so as to be relatively outwardly immobile and substantially fragmentation resistant under said explosion, said end walls being integral extensions of at least one of said inner and outer walls, all of said walls defining between them at least one cavity charged with explosive material and including a closed parting, said outer wall and end walls initially substantially sealing and confining said charge sufficiently to direct upon explosion thereof the pressure substantially completely inwardly to deform at least said inner wall and thereby finally venting said cavity at said parting, said inner wall being less resistant to plastic deformation by said pressure than said other walls, and a stem member having an exterior annular surface adapted to be put into said double walled member adjacent said inner wall, said inner wall being adapted to be permanently compressed inwardly by said explosion around said surface to accomplish a connection between said members, said inner wall and cavity being of a concentric annularly uniform construction and being adapted for concentric positioning and accomplishing radially inward deformation with circumferentially uniform distribution thereof with respect to said exterior annular surface.

8. The device of claim 7 wherein the double walled member is a radially split O-ring of deformable material.

9. The device of claim 7 wherein the double walled member is press fitted within a relatively rigid tough sleeve.

10. The device of claim 6 wherein the deformable collar is bowed radially outwardly into the explosive-bearing recess of the sleeve.

11. The device of claim 5 wherein the collar member is of greater outwardly extending radial thickness and mass at one end than at the other.

12. The device of claim 6 wherein the axial length of the collar exceeds that of the sleeve.

13. The device of claim 11 wherein the axial length of the collar exceeds that of the sleeve.

14. The device of claim 5 wherein the collar member and outer confining means are separate members press fitted together on a taper leaving one end of the collar member of greater outwardly extending radial thickness.

15. The device of claim 7 wherein the inner wall is bowed radially outwardly into the cavity.

16. The device of claim 7 wherein the double-walled member is a radially split O-ring of deformable material fitted with a relatively rigid tough sleeve.

17. An explosive securing device adapted to join at least two objects with surfaces in contact by being disposed in aligned holes extending through said objects, said device comprising a headed bolt the shank of which is of sufficient length to pass through and leave an end portion of said shank projected beyond said aligned array of holes, said projecting end having at least one circumferential groove, and an unthreaded nut member consisting of a circumferentially cavitated collar of deformable material adapted upon deformation to encircle said grooved portion in form-fitting contact with said bolt shank opposite said grooves, said collar having radially outward extending flanges one of which extends outwardly in excess of the other and is disposed at an end of said collar adapted to be positioned adjacent said holes for abutment with one of said objects, the other of said flanges being axially outwardly deformable by explosion, said cavity being located intermediate the ends of said collar between said flanges and being loaded with a charge of detonating explosive, and a separable sleeve of greater tensile strength and hardness than said collar press fitted about said collar against said extended end flange to substantially close said cavity in charge sealing relationship and with said flanges to direct said explosion of the charge against said collar to deform it into firm secured relationship with said bolt with said abutment while effecting separation of said collar and sleeve.

18. In the device of claim 17, a radially inward extending flange on the end of the sleeve adjacent the flange of said other collar.

References Cited in the file of this patent

UNITED STATES PATENTS

| | | |
|---|---|---|
| 2,001,145 | Lambert | May 14, 1935 |
| 2,367,206 | Davis | Jan. 16, 1945 |
| 2,542,376 | Torresen | Feb. 20, 1951 |
| 2,604,042 | Cook | July 22, 1952 |
| 2,779,279 | Maiwurm | Jan. 29, 1957 |
| 2,811,730 | Vegren | Nov. 5, 1957 |